United States Patent [19]

Futer

[11] 4,191,499
[45] Mar. 4, 1980

[54] LIVE STORAGE SYSTEM
[75] Inventor: Rudolph E. Futer, Alameda, Calif.
[73] Assignee: Futerized Systems, Inc., Hayward, Calif.
[21] Appl. No.: 926,621
[22] Filed: Jul. 25, 1978
[51] Int. Cl.$^2$ ............................................. B65G 51/02
[52] U.S. Cl. ........................................ 406/34; 406/88; 406/93; 406/117; 406/155; 406/198
[58] Field of Search ..................... 198/347; 406/88, 89, 406/34, 117, 155, 198, 93, 94; 414/134, 277, 278, 279

[56] References Cited
U.S. PATENT DOCUMENTS

| | | | |
|---|---|---|---|
| 3,131,974 | 5/1964 | Futer | 406/88 |
| 3,173,557 | 3/1965 | Eliassen | 414/134 X |
| 3,580,640 | 5/1971 | Eriksson | 406/88 X |
| 3,738,506 | 6/1973 | Cornford et al. | 414/279 X |
| 3,869,843 | 3/1975 | Darrah et al. | 406/153 X |
| 3,873,163 | 3/1975 | Gladish | 406/88 |
| 4,078,498 | 3/1978 | Futer | 406/153 X |

Primary Examiner—James L. Rowland
Attorney, Agent, or Firm—Bruce H. Johnsonbaugh

[57] ABSTRACT

A live storage system for packages is provided in which a rack has a plurality of storage rows, each row having a slot along its base. An input lane for the packages extends along one side of the storage rack and an output lane for the packages extends along another side of the storage rack. A traveler mounted beneath the storage rack moves to positions beneath each of the rows. The traveler has an air plenum with a plurality of air jets extending through the upper surface of the plenum. The traveler has a diverter at each end to divert packages from the input lane to a storage row, and to divert packages from a storage row to the output lane. An air supply pressurizes the plenum of the traveler and the pressurized air flows through the jets in the upper surface of the traveler and through the slot in the base of each of the storage rows to create an air film along which the packages are conveyed onto and off of each storage row. An accumulating conveyor gathers slugs of packages for the storage system.

10 Claims, 10 Drawing Figures

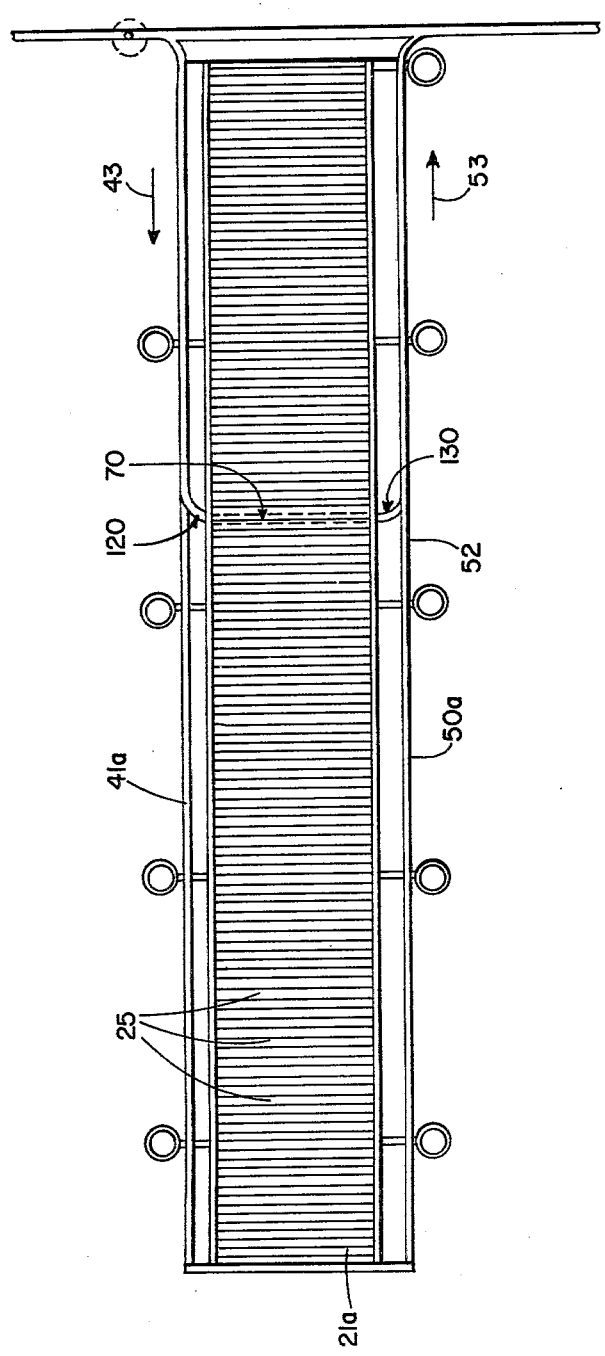

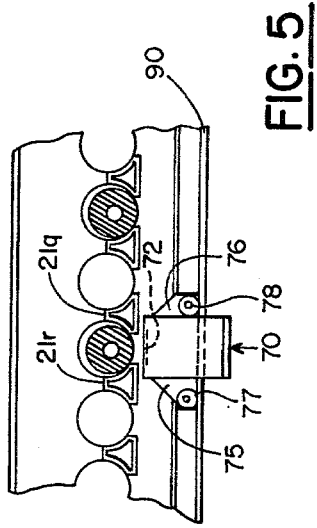
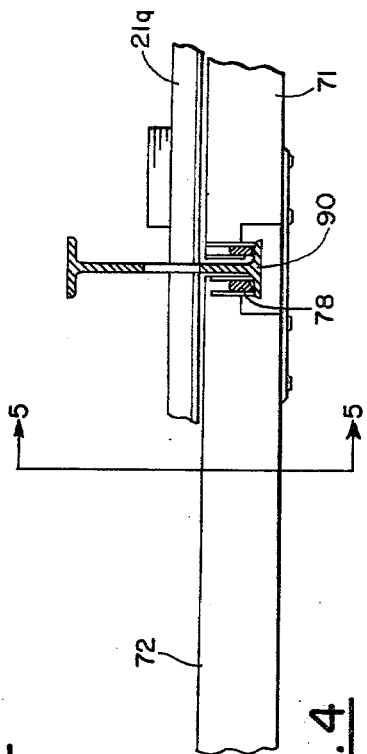
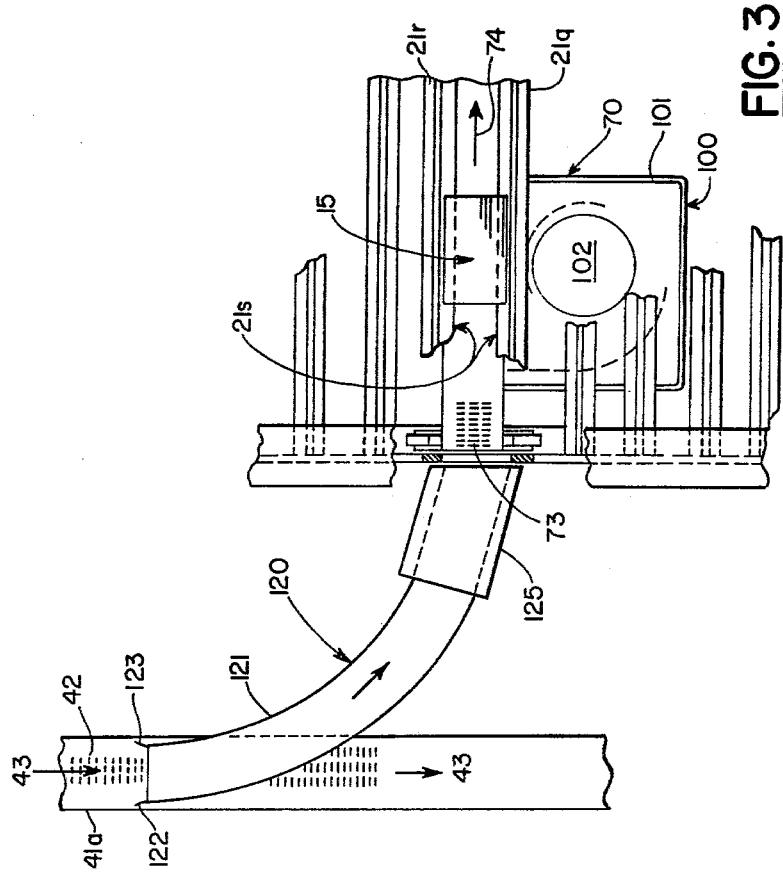

LIVE STORAGE SYSTEM

This invention relates to live storage systems in general and in particular to a live storage system for rolled packages such as paper towels and toilet paper and flat packages such as cigarettes and the like.

In packaging commercial orders for various color combinations of paper rolls, it is necessary to vary the color assortment of packaged paper rolls presented to the case packer. The prior art system of varying the color assortment in each box packaged by a case packer has been to manually sort and present the desired assortment to the packaging machine.

The present invention provides a live storage system capable of storing an assortment of packages, and on command, to supply case packing machinery or other processing machinery with the desired assortment of packages as required. Although the invention as described below is directed to providing different color assortments of paper towels, the invention provides a live storage system which can be used for a variety of products.

A primary object of the invention is to provide a live storage system capable of storing and retrieving a variety to products on command.

A further object of the invention is to provide a live storage system for packaged goods which automatically stores and retrieves varied assortments of the goods for presentation to packaging or processing facilities.

A further object of the invention is to provide a live storage system which automatically counts the packages entering and leaving the system to provide a running inventory record.

Another object of the invention is to provide a live storage system which automatically accumulates slugs of packages for processing by the remainder of the storage system.

A further object of the invention is to provide a live storage system capable of storing rolls of packaged paper of various colors and for presenting on command a desired combination of colors to a case packer.

Further objects and advantages of the invention will become apparent from the following description of the preferred embodiment and the drawings, wherein:

FIG. 2 is a plan view of a portion of the system;

FIG. 3 is a plan view of the diverter;

FIG. 4 is a side view of the traveler and a portion of the system;

FIG. 5 is a sectional view along the line 5—5 of FIG. 4;

Figure 1:
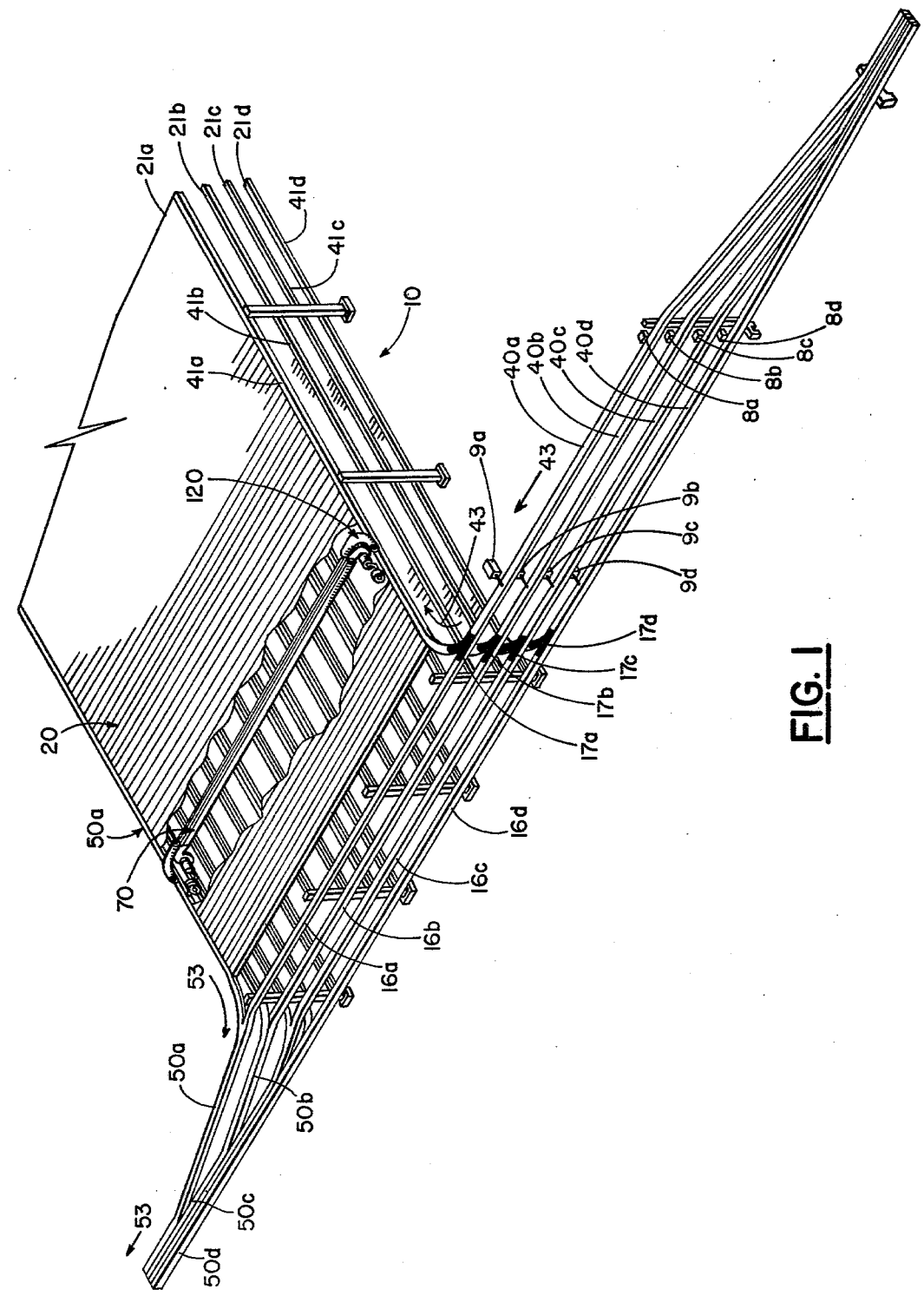
FIG. 1 is a perspective view, partially in section, of the system.

Referring to FIG. 1, the live storage system shown generally as 10 comprises a storage rack for paper towels shown generally as 20. Input lanes 41a, 41b, 41c and 41d extend along one side of storage rack 20 and convey packages in the direction of arrow 43. Output lanes 50a, 50b, 50c and 50d extend along another side of storage rack 20 and convey packages in the direction of arrow 53. A traveler 70 is mounted beneath each level of storage rack 20. Traveler 70, on command, moves packages onto ("put") and off of ("take") storage rack 20. The packages are conveyed on a film of air utilizing the Coanda effect, as shown in U.S. Pat. No. 3,131,974, which has been known in the art and is not a part of this invention.

The overall purpose of the embodiment of FIG. 1 is to store various colors of packaged rolled paper towels at predetermined locations on storage rack 20 and to retrieve predetermined assortments of colored packages from the storage rack 20 to be delivered to a case packer or other processing facilities not shown in the drawings.

FIG. 1 shows an array of four levels 21a, 21b, 21c and 21d of storage rack 20. On each of these four levels, a different color of paper towels (not shown) is stored. FIG. 2 is a plan view of storage rack 21a. Rack 21a has a plurality of storage rows 25. Input lane 41a extends along one side of storage rack 21a and output lane 50a extends along another side of rack 21a. Input lane 41a has a slotted plenum 42 which is an input conveyor means as shown best in FIG. 3. The slotted plenum 42 is designed as is known in the art (for example, U.S. Pat. No. 3,131,974) to move packages in the direction of arrow 43. Similarly, an output conveyor means 52 for output lane 50a comprises a slotted air plenum 52 similar to slotted air plenum 42 for moving packages of toilet paper in the direction of arrow 53. Mechanical roller conveyors can also be used as input conveyor means and output conveyor means.

Figure 6:
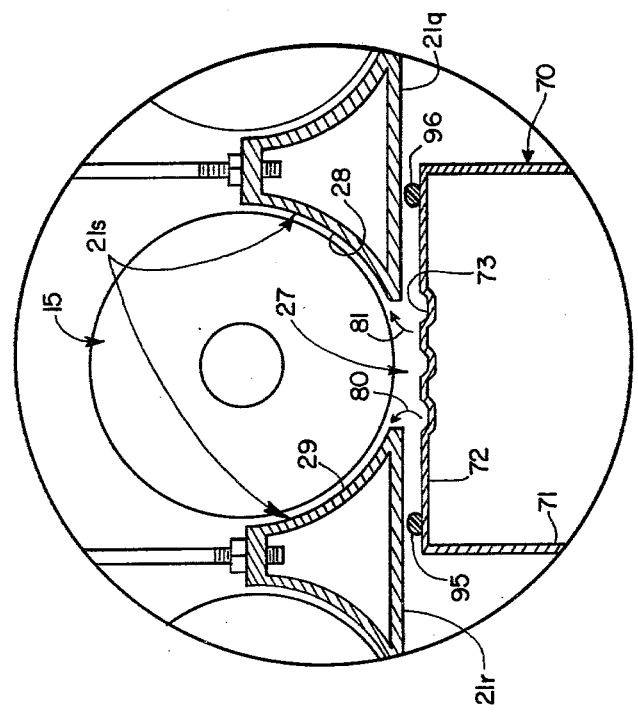
FIG. 6 is a sectional view of a portion of the system.

FIGS. 3, 4 and 5 show traveler 70. As shown in FIG. 4, traveler 70 has an air plenum 71 which extends horizontally the length of storage row 21s. Plenum 71 has an upper surface 72 which contains a plurality of air jets 73 along its entire length which are oriented to convey a rolled paper towel package 15 in the direction of arrow 74. As shown in FIG. 5, traveler 70 has a pair of support flanges 75 and 76 which carry rollers 77 and 78 respectively, which in turn ride on support rail 90. Air supply means 100 is a fan housing 101 connected integrally to plenum 71 and carries a fan 102 driven by a motor (not shown) mounted directly to fan 102. Fan 102 pressurizes plenum 71, forcing air through air jets 73 as shown in FIG. 6. The pressurized air follows the path of arrows 80 and 81 of FIG. 6, through slot 27 formed in the base of the storage row 21s formed between supports 21q and 21r. A film of air is created beneath package 15, conveying package 15 in the direction of arrow 74 of FIG. 3. Referring again to FIG. 6, when traveler 70 is moved along rails 90 and 91 to a position beneath another storage row, there is no longer an air film between package 15 and elements 21q and 21r and, therefore, package 15 will come to rest upon elements 21q and 21r.

Elements 21q and 21r have support surfaces 28 and 29, respectively, which are parallel to the lower surface of package 15. In the case of paper towel rolls, surfaces 28 and 29 have a radius of curvature the same as the radius of curvature of package 15. This enables formation of a uniform film of air between package 15 and surfaces 28 and 29.

Figure 10:
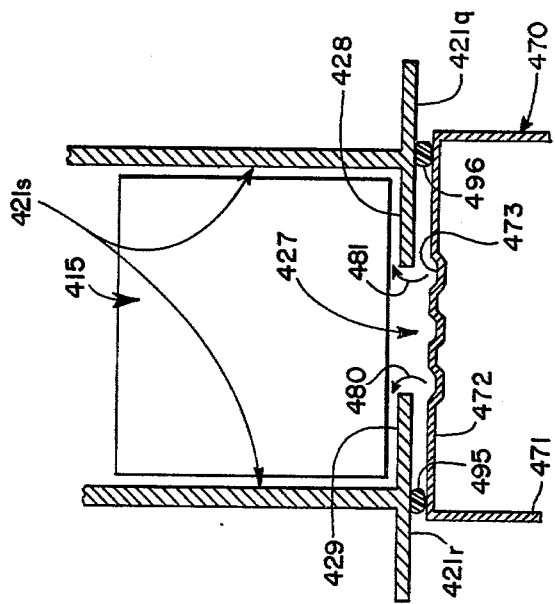
FIG. 10 is a sectional view of an alternate embodiment.

In storing heavier packages, sealing means 95 and 96 (FIG. 6) are provided to reduce air loss between the upper surface of traveler 70 and the base elements 21q and 21r of the selected storage row. Sealing means 95 and 96 are carried by the upper surface of traveler 70 and are made of flexible material such as neoprene. Alternately, as shown in FIG. 10, sealing means 495 and 496 are carried by the base elements 421q and 421r. The sealing means may be inflatable rather than of fixed diameter. Inflatable sealing means are inflated by compressed air supplied directly to the sealing means from a compressed air source (not shown) through line 501 (see FIG. 8).

Diversion means 120 is shown in FIGS. 3 and 4. The purpose of diversion means 120 is to divert packages from input lane 41a to a selected storage row. As shown in FIG. 3, diversion means 120 has already diverted package 15 from input lane 41a onto storage row 21s. One embodiment of diversion means 120 is shown in FIGS. 3 and 4, and comprises a cylindrical tube 121 of slightly larger inner diameter than package 115. Tube 121 is formed in a 90° angle and has entry guides 122 and 123 to assist package 15 into tubular elbow section 121. Package 15 is drawn through diversion means 120 by a partial vacuum generated in acceleration means or booster 125 by air jets 126 which direct air from plenum 71 of traveler 70 in the direction of the arrows 127 of FIG. 4. A similar diversion means 130 is mounted on the other end of traveler 70 for removing packages from row 21s and placing them on output lane 50a (see FIG. 2).

Figure 7:
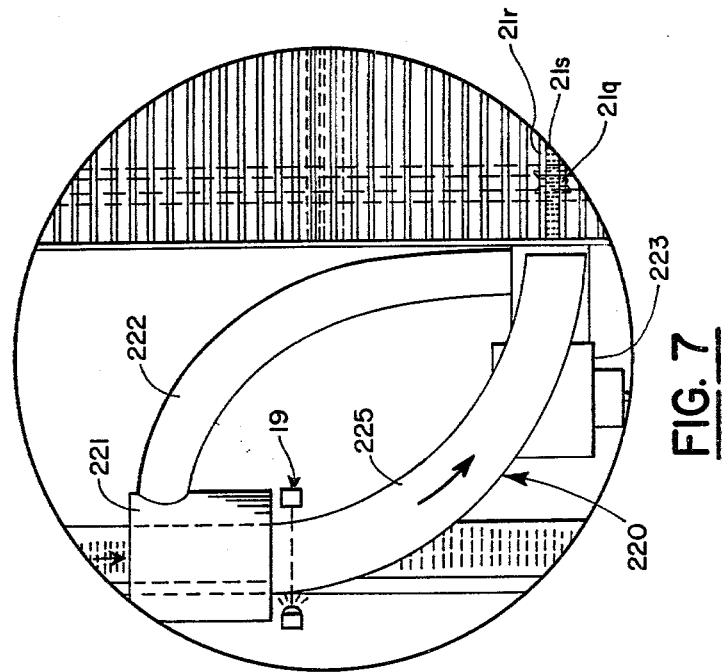
FIG. 7 is a plan view of an alternate diverter.

FIG. 7 shows an alternate diversion means 220 which incorporates an accelerator or booster 221 as disclosed in U.S. Pat. No. 4,078,498. Accelerator 221 is fed pressurized air through input pressure tube 222 which in turn is fed by fan 223. This booster provides a high-energy burst to package 15 as it passes through accelerator 221 and is driven through elbow 225. Accelerator 221 separates the packages. The gaps thereby caused between packages enables counting means 19 located downstream of accelerator 221 to operate. Counting means 19 enables running inventory control. Counting means 19 as shown is an optical sensor, but may be any suitable sensor. As package 15 exits from elbow 225, it passes between storage elements 21q and 21r forming storage row 21s.

Figure 8:
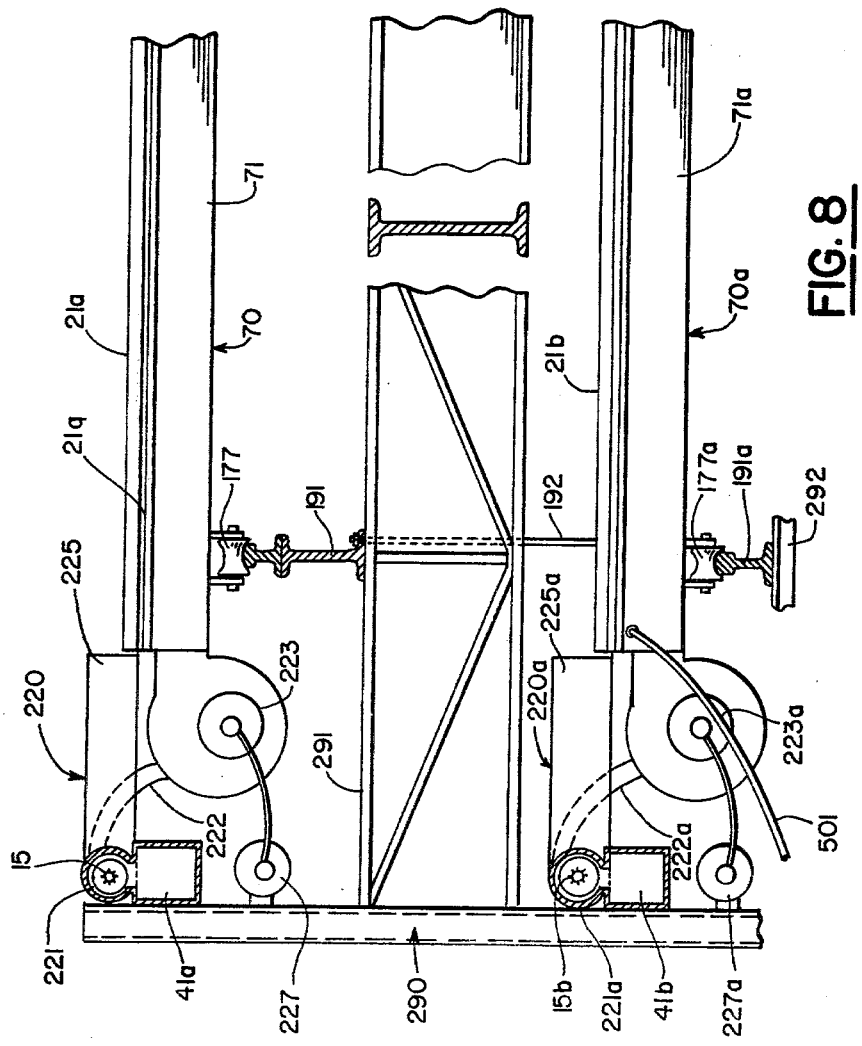
FIG. 8 is a side elevational view of a portion of the system using the diverter of FIG. 7.

FIG. 8 is a side elevational view of storage levels 21a and 21b with travelers 70 and 70a, respectively, mounted thereunder. Diverters 220 and 220a are the same as diverter 220 of FIG. 7. Input lanes 41a and 41b are shown delivering packages 15 and 15a into accelerators 221 and 221a. Air pressurization means 223 and 223a are fans driven by motors wired to cable reels 227 and 227a. The suspension for travelers 70 and 70a as well as input lanes 41a and 41b and cable reels 227 and 227a is shown in FIG. 8; side wall 290 may be any sufficiently strong structural wall capable of supporting the storage racks and the items being stored in the system. Support beam 291 is connected to side wall 290 and supports guide rail 191 which in turn carries roller 177 for traveler 70. Storage rack 21b is suspended by hangers 192. Beam 191a is supported by supporting beam 292 and in turn supports roller 177a for traveler 70a.

Figure 9:
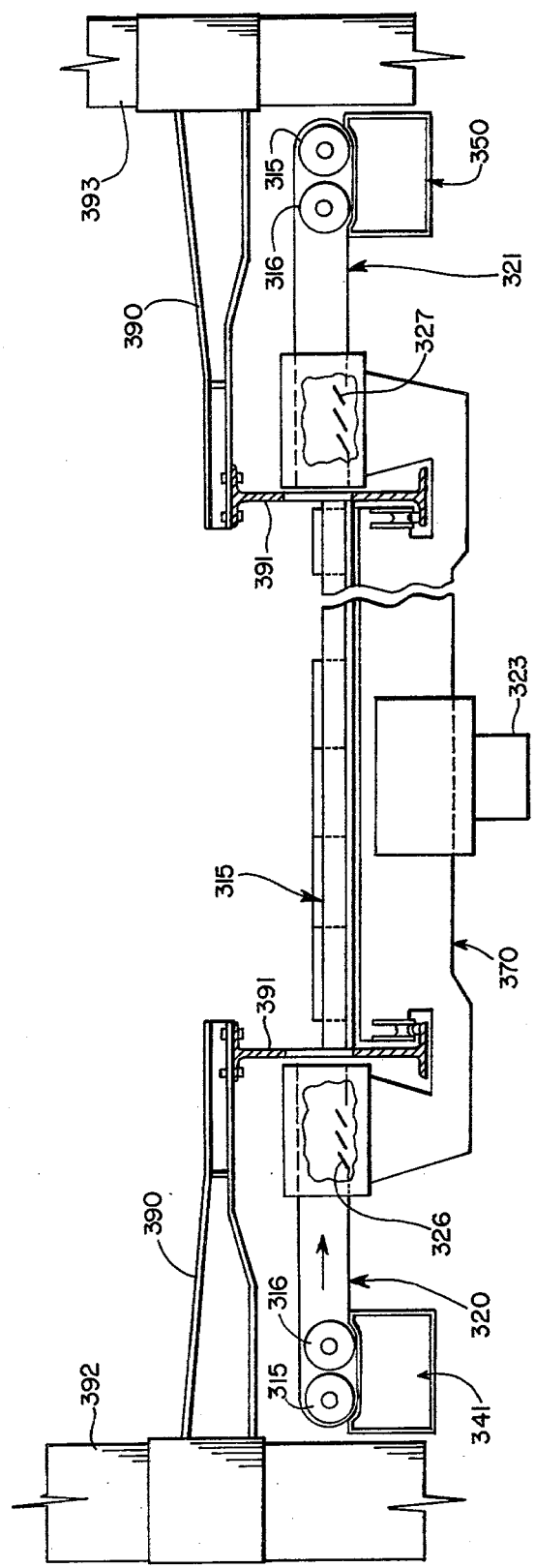
FIG. 9 is a side elevational view of an alternate embodiment.

FIG. 9 shows an alternate embodiment of the invention designed for handling double-roll packages shown as 315 and 316. Input lane 341 is similar to input lane 41a with the exception that it is wide enough to accommodate rolled packages 315 and 316 and output lane 350 is similar to input lane 341. Support rails 391 are suspended from support beams 390 which in turn are carried by side walls 392 and 393. In the embodiment of FIG. 9, traveler 370 is connected to a centrally mounted air pressurization means 323 which pressurizes the air jets 326 of the diverter 320 connected to input lane 341 and the air jets 327 of diverter means 321 connected to output lane 350.

FIG. 10 shows an alternate embodiment for flat-surfaced packages such as cigarettes 415. The elements of FIG. 10 correspond to the elements of FIG. 6 with the exception of sealing means 495 and 496 which are carried by elements 421q and 421r. Surfaces 428 and 429 conform to and are parallel to the lower surface of package 415.

Referring again to FIG. 1, bypass lanes 16a, 16b, 16c and 16d are provided which short-circuit storage rack 20. Bypass lanes 16a, 16b, 16c and 16d are utilized whenever it is not necessary to put the packages into storage rack 20.

In operation, "slugs" of rolled packages are transported through the system. As used herein, "slug" means that number of packages which will fully occupy one storage row. Packages of various colors of papers are produced upstream of and conveyed to accumulating conveyors 40a, 40b, 40c and 40d, where they gather in front-to-back contact behind stops 9a, 9b, 9c and 9d. When a slug of any given color is accumulated, one of high level sensors 8a, 8b, 8c and 8d signals its respective stop 9a, 9b, 9c or 9d to retract. The slug then enters its respective switch 17a, 17b, 17c or 17d. For example, if yellow paper is being stored in storage rack 21a, and is needed immediately by the case packaging machinery (not shown) downstream of output lane 50a, switch 17a directs the slug along bypass lane 16a onto output lane 50a. On the other hand, if the slug is not needed immediately by the case packaging machinery, switch 17a directs the slug down input lane 41a adjacent storage rack 21a. Diverter 120 then diverts the slug and "puts" the slug on a vacant storage row. If a second slug of yellow paper accumulates behind stop 9a and is not needed by the case packaging machinery, it also moves down input lane 41a adjacent storage rack 21a. Traveler 70 moves into position on the next available vacant storage row and diverts the second slug into storage position. If the case packaging machinery then calls for two slugs of yellow paper, traveler 70 is switched into its "take" mode in which it moves underneath a filled storage row of storage rack 21a, empties the slug of yellow paper off that storage row onto output lane 50a, then traveler 70 moves into position beneath the next full storage row and takes the slug of yellow paper on that storage row and diverts the slug onto output lane 51a for transport to the case packaging machinery.

It is within the scope of this invention to store several different products on the various storage levels and to utilize appropriately designed input and output lanes as well as appropriately designed travelers for the various products being stored. The embodiment shown in FIG. 1 utilizes identical travelers on each of the four storage levels and identical storage racks and storage rows in each of the four levels.

In the embodiment of FIG. 1, for paper hand towels, each storage row is 40 feet in length, and the width of each slot 27 is 3 inches. Traveler 70 has a cross-sectional area of 100 square inches, the upper surface is 8 inches wide with 72 linear inches of air jets per square foot with an average depth of 1/16 inches. The fan pumps 2000 cfm, and the vertical clearance between the traveler 70 and the bottom of elements 21q and 21r is $\frac{1}{8}$ to $\frac{1}{4}$ inches.

The traveler 70 can be driven along its guide rails and positioned in various ways, one of which is described in U.S. Pat. No. 3,869,843 (FIG. 12), which shows the positioning of the free end of a pivoted conveyor. This mechanism of U.S. Pat. No. 3,869,843 could be used on each end of the traveler 70 described herein.

I claim:

1. In a live storage system for packages wherein a plurality of storage rows is arranged to support said packages and each storage row has a slot along its base, the improvement comprising:
    a traveler mounted beneath said storage rows and movable to positions beneath each of said rows, said traveler having an air plenum and a plurality of air jets along the upper surface of said plenum, and
    air supply means for pressurizing the plenum of said traveler, whereby the pressurized air flows through said air jets of said traveler and through said slot of one of said storage rows to create an air film along which said packages are conveyed.

2. The system of claim 1 further comprising:
    an accumulating conveyor which accumulates a slug of packages, and
    conveying means for transporting said slug onto one of said storage rows.

3. The system of claim 1 wherein an input lane and an output lane run along opposite sides of said storage rows further comprising:
    diversion means carried by said traveler for diverting packages from said input lane onto a selected storage row, and for diverting packages from a selected storage row to said output lane.

4. The system of claim 3 further comprising:
    an acceleration means for separating each of said packages, and
    counting means located downstream of said acceleration means.

5. The system of claim 4 further comprising:
    input conveyor means for conveying said packages along said input lane, and
    output conveyor means for conveying said packages along said output lane,
    wherein said input and output conveyor means are slotted air plenums which convey said packages on an air film.

6. The system of claim 1 further comprising:
    sealing means carried by the upper surface of the plenum of said traveler to reduce air loss between said upper surface and the base of a selected storage row.

7. The system of claim 1 further comprising:
    sealing means carried by the base of each of said storage rows to reduce air loss between said traveler and the base of a selected storage row.

8. A live storage system for packages comprising:
    a storage rack for said packages having a plurality of storage rows, each of said rows having a slot along its base,
    an input conveyor means for moving packages along one side of said storage rack,
    output conveyor means for moving packages along the opposite side of said storage rack,
    a traveler mounted beneath said storage rack and movable to positions beneath each of said rows, said traveler having an air plenum and a plurality of air jets along the upper surface of said plenum,
    diversion means carried by said traveler for diverting packages from said input conveyor means to a selected storage row, and for diverting packages from a selected storage row to said output conveyor means, and
    air supply means for pressurizing the plenum of said traveler, whereby the pressurized air flows through said air jets of said traveler and through the air slot of one of said rows to create an air film along which said packages are conveyed.

9. The system of claim 8 further comprising:
    an accumulating conveyor which accumulates a slug of packages.

10. The apparatus of claim 8 wherein said input and output conveyor means are slotted air plenums which convey said packages on an air film.

* * * * *